Figure 1:
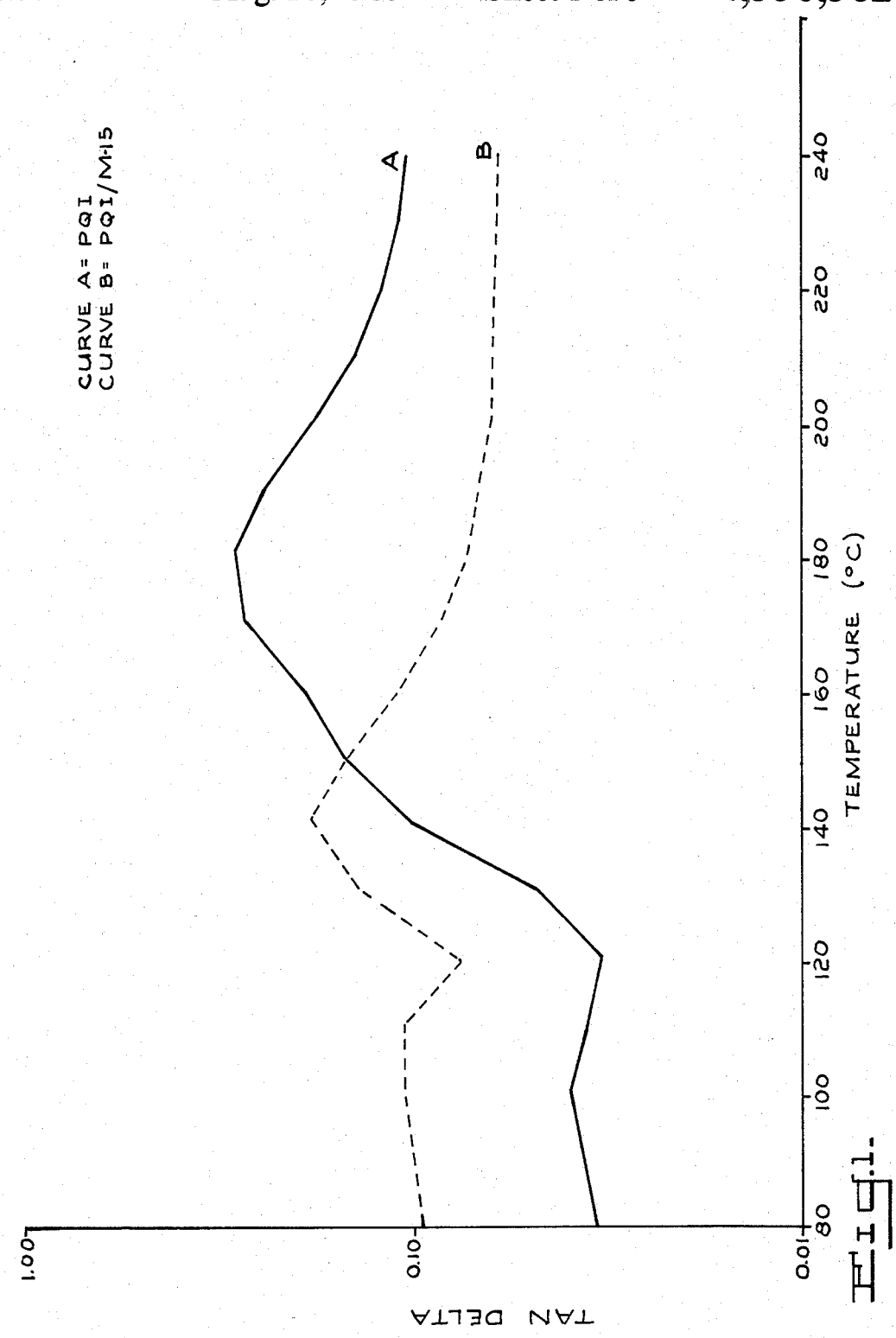

United States Patent [19]

Deex

[11] Patent Number: 4,536,562

[45] Date of Patent: Aug. 20, 1985

[54] LIQUID CRYSTALLINE POLYESTERS

[75] Inventor: Oliver D. Deex, Longmeadow, Mass.

[73] Assignee: Monsanto Company, St. Louis, Mo.

[21] Appl. No.: 688,832

[22] Filed: Jan. 4, 1985

[51] Int. Cl.$^3$ .............................................. C08G 63/60
[52] U.S. Cl. .................... 528/193; 528/191; 528/194; 528/271
[58] Field of Search ............... 528/191, 193, 194, 271

[56] References Cited

U.S. PATENT DOCUMENTS

| | | | |
|---|---|---|---|
| 3,637,595 | 1/1972 | Cottis et al. | 528/193 |
| 3,991,103 | 11/1976 | Pletcher | 528/193 |
| 4,064,108 | 12/1977 | Inata et al. | 528/193 |
| 4,118,372 | 10/1978 | Schaefgen | 528/191 |
| 4,153,779 | 5/1979 | Jackson, Jr. et al. | 528/191 |
| 4,238,600 | 12/1980 | Jackson, Jr. et al. | 528/191 |
| 4,242,496 | 12/1980 | Jackson, Jr. et al. | 528/191 |
| 4,287,332 | 9/1981 | Jackson, Jr. et al. | 528/191 |
| 4,311,824 | 1/1982 | Fayolle | 528/190 |
| 4,333,907 | 6/1982 | Uraski et al. | 528/193 |
| 4,347,349 | 8/1982 | Siemionko | 528/193 |
| 4,360,658 | 11/1982 | Jackson, Jr. et al. | 528/193 |
| 4,370,466 | 1/1983 | Siemionko | 528/193 |
| 4,377,681 | 3/1983 | Deex | 528/193 |
| 4,390,681 | 6/1983 | Deex | 528/193 |
| 4,444,980 | 4/1984 | Deex | 528/193 |
| 4,447,593 | 5/1984 | Funakoshi et al. | 528/191 |

*Primary Examiner*—Lester L. Lee
*Attorney, Agent, or Firm*—R. B. Blance; W. J. Farrington; P. D. Matukaitis

[57] ABSTRACT

Disclosed are liquid crystal copolyesters prepared from p-hydroxybenzoic acid, isophthalic and/or terephthalic acid, hydroquinone, and a mono-substituted hydroquinone wherein the substituent is selected from the group consisting of alkyls of 1 to 6 carbon atoms, phenyl and phenyl substituted with an alkyl of 1 to 6 carbon atoms, chloro, bromo, cyano, formyl, acetyl, and trifluoromethyl, wherein, when a specific amount of the hydroquinone is replaced by a specific substituted hydroquinone, the copolyester not only becomes more tractable but also unexpectedly more crystalline when compared to the unsubstituted copolyester.

13 Claims, 3 Drawing Figures

LIQUID CRYSTALLINE POLYESTERS

This invention relates to liquid crystalline polyarylates and in particular to copolyesters of p-hydroxybenzoic acid, isophthalic acid and/or terephthalic acid, hydroquinone, and a substituted hydroquinone.

The use of objects molded from synthetic polymers has expanded rapidly in the last several decades. In particular, polyesters have gained wide acceptance for general molding applications. Although most polyesters have mechanical properties suitable for general molding applications, most polyesters are not suitable for high strength service because the mechanical properties are not sufficiently high. One group of polyesters that is suitable for high strength service without the need of a reinforcing agent is a new class of polymers exhibiting a general overall balance of mechanical properties substantially enhanced over previous polymers. These polymers have been described by various terms, including "liquid crystalline", "liquid crystal", and "anisotropic". Briefly the polymers of this new class are thought to involve a parallel ordering of the molecular chain. The state wherein the molecules are so ordered is often referred to either as the liquid crystal state or the nematic phase of the liquid crystal state. These polymers are prepared from monomers which are generally long, flat and fairly rigid along the long axis of the molecule and have chain extending linkages that are either coaxial or parallel. For example, liquid crystal copolyesters have been prepared from the following fairly rigid molecular species: p-hydroxybenzoic acid, hydroquinone and terephthalic or isophthalic acid. Such copolyesters are generally high melting and intractable.

It is known that tractable copolyesters can be prepared by substituting a portion of the hydroquinone or a portion of the diacid with a different species to disrupt the ordered chain See, e.g. U.S. Pat. No. 4,311,824 and W. Bruce Black, *Flow-Induced Crystallization* 245, 246 (Gordon and Breach Science Publ. Ltd 1979). I have now found that when a specific amount, from about 1 mole % up to about 50 mole %, of the hydroquinone is replaced with a specific substituted hydroquinone that the thermotropic copolyester not only is more tractable and lower melting but is also unexpectedly more crystalline. The increase in the degree of crystallinity is indicated by the fact that the ratio of the storage moduli of the claimed copolyester determined at $T_g-50°$ C. and $T_g+50°$ C. is less than the ratio of the storage moduli determined at $T_g-50°$ C. and $T_g+50°$ C. of a copolyester of identical composition except that none of the hydroquinone has been substituted. For a discussion of the relationship between the change in storage modulus at $T_g$ and the degree of crystallinity, see L. E. Nielsen, *Mechanical Properties of Polymers and Composites* 181-89 (Dekker 1974).

The increased crystallinity of the copolyester confers several advantages. The copolyester becomes less susceptible to high temperature distortion and to solvent attack. Further, in the preparation of the copolyesters, the more ready crystallization of their prepolymers facilitates solid state polymerization allowing a faster rate of polymerization and diminished caking and discoloration during polymerization. Thus the copolyesters of the present invention have improved crystallinity and are capable of forming a thermotropic melt phase, have an inherent viscosity of at least about 0.3, and consist essentially of units supplied by the following divalent radicals:

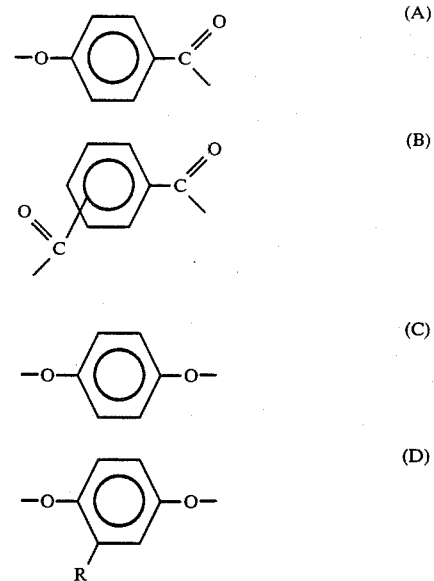

wherein the placements of the carbonyl groups of the B radicals are meta or para or are a mixture of meta and para; wherein R is selected from the group consisting of alkyls of from 1 to 6 carbon atoms, phenyl and phenyl substituted with an alkyl of 1 to 6 carbon atoms, chloro, bromo, cyano, formyl, acetyl, and trifluoromethyl; wherein the amount of radical A is in the range from about 10 mole % to about 60 mole % of said copolyester and wherein the amount of radical D is selected in the range from about 1 mole % up to about 50 mole % of the total amount of radicals C and D to provide a ratio of storage moduli of said copolyester determined at $T_g-50°$ C. and $T_g+50°$ C. less than the ratio of the storage moduli determined at $T_g-50°$ C. and $T_g+50°$ C. of a copolyester of identical composition except that the D radicals are replaced with C radicals.

The copolyesters of the present invention are prepared by an acidolysis procedure in which esters of monocarboxylic acids such as acetic acid are prepared by esterification of the phenolic hydroxy group of p-hydroxybenzoic acid, hydroquinone, and the substituted hydroquinone and are reacted with the aromatic dicarboxylic acid at a temperature in the range of about 250° to about 340° C. The esters can be prepared in situ by reaction of the phenols with acetic anhydride.

The amount of substituted hydroquinone in the copolyester is determined by the requirement that the ratio of the storage moduli be less than the ratio of the storage moduli of a copolyester of identical composition without any substitution of the hydroquinone. The amount of substituted hydroquinone necessary for increased crystallinity manifested in a lower storage modulus ratio will depend upon the specific substituted hydroquinone. For example, the preferred substituted hydroquinone is methylhydroquinone and the preferred range of substitution with methylhydroquinone is between about 1% and about 25%, and the more preferred range is between about 5% and about 20%.

Figure 2:
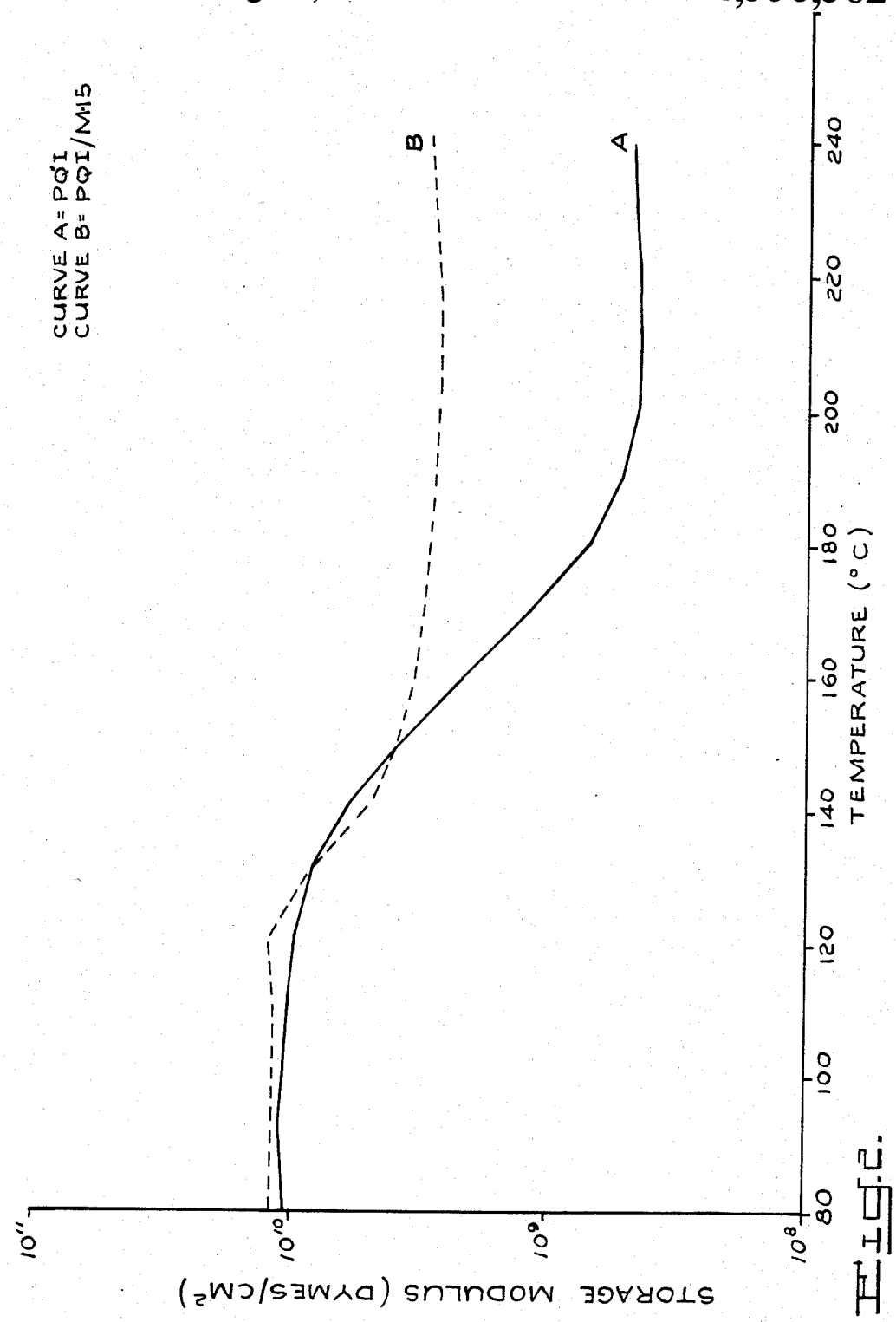

FIGS. 1 and 2 illustrate the dynamic mechanical analyses necessary to determine the ratio of the storage moduli for each copolyester. All measurements were made on a Direct Reading Autovibron (made by IMASS, USA) using a 0.15 mm film and scanning at 1° C./min. FIG. 1 illustrates two damping (tan delta) curves A and B, the copolyester of curve A (PQI) containing 33.3 mole % each p-hydroxybenzoic acid, isophthalic acid, and hydroquinone and the copolyester of curve B (PQI/M-15) containing 33.3 mole % each p-hydroxybenzoic acid and isophthalic acid, 28.3 mole % hydroquinone, and 5.0 mole % methylhydroquinone (15 mole % of the total hydroquinone). $T_g$, or the glass transition temperature, used to determine the ratio of the storage moduli is defined for purposes of this disclosure as coincident with the maximum of the damping (tan delta) curve FIG. 2 illustrates the change in the storage moduli as a function of temperature Curves A and B are of those copolyesters previously defined A decrease in the modulus drop, as is observed in FIG. 2 for a copolyester in which 15 mole % of the total hydroquinone has been replaced by methylhydroquinone, curve B, indicates an increase in crystallinity when compared with a copolyester in which none of the hydroquinone has been substituted, curve A.

In general the copolyester should have an inherent viscosity of at least about 0.3 and more preferably at least about 0.5 in order to provide adequate mechanical properties. The inherent viscosity can, if desired, be increased to values of 0.7 or even higher using conventional techniques such as melt or solid state polymerization. The inherent viscosity is determined at 30° C. with a solution of 0.5 gm of copolyester per 100 ml of a solvent composed of 60 weight % phenol and 40 weight % tetrachloroethane.

Although not wishing to be held to theory, I believe that, as small amounts of the bulkier substituted hydroquinone are introduced into the copolyester the free volume around the polyester chains is increased just enough to allow them to pack more easily, yielding a more crystalline polymer. It is suggested that the drop in the storage modulus at $T_g$ observed in FIG. 2 is due to the fraction of the polymer which is amorphous in character becoming more elastic above $T_g$. As is known, for a perfectly crystalline substance, no $T_g$ is observed and the ratio is zero. Therefore, when two copolyesters with differing degrees of crystallinity are compared, it is expected that the drop across $T_g$ would be less for the more crystalline one. Support for such a theory is found in L. E. Nielsen, supra.

Advantageously the ratios of monomers in the copolyesters of the present invention can be selected to provide copolyesters which are tractable at a low temperature, the flow temperature at which they form a thermotropic melt phase being below 340° C., and which have a high long-term use temperature associated with a high glass transition temperature. Preferably the glass transition temperature is at least about 110° C. Advantageously the amount of substituted hydroquinone introduced into the copolyester is such that the ratio of the storage moduli of said copolyester is less than 95%, preferably less than 60%, and more preferably less than 30%, of the ratio of the storage moduli of a copolyester of identical composition except that the D radicals are replaced with C radicals Among the preferred compositions are copolyesters containing from about 15 to about 40 mole % of p-hydroxybenzoic acid units and more preferably compositions containing from about 20 to about 35 mole % p-hydroxybenzoic acid units. The dicarboxylic acid may be present in any ratio of meta to para isomers, but the preferred acid units are 100% meta.

The copolyesters of the present invention can contain nucleating agents, fillers, pigments, glass fibers, mineral reinforcing agents, antioxidants, stabilizers, plasticizers, lubricants, fire-retardants and other additives.

The copolyesters are useful for preparing molded objects, films, fibers and the like. For example, they may be injection molded by conventional means, and they may be formed into fibers by melt spinning and subsequently drawn and further processed according to conventional techniques.

The invention is further illustrated but is not intended to be limited by the following examples in which parts and percentages are by weight unless specified otherwise.

COMPARATIVE EXAMPLE

A mixture of 0.1 part by weight $K_3PO_4.12H_2O$, 10.0 parts by weight (0.072 mole) p-hydroxybenzoic acid, 8.0 parts by weight (0.073 mole) hydroquinone, 12.1 parts by weight (0.073 mole) isophthalic acid, and 25.0 parts by weight (0.244 mole) acetic anhydride is placed in a reaction vessel equipped with a stirrer and condenser. The mixture is heated under a nitrogen blanket at reflux (130° C.) for about 1 hour. Next the temperature of the bath is raised slowly to 250° C. and approximately 16 parts by weight of acetic acid and acetic anhydride are distilled. There is a brief cessation of acetic acid distillation after the ester, acetic acid and excess anhydride distill, but at 250° C. polymerization soon starts and more acetic acid distills The bath temperature is raised at a rate sufficient to keep the acetic acid distilling at a reasonable rate. When about 28 parts by weight (total) distillate are collected and the reaction temperature is about 290°–300° C., vacuum is gradually applied to finish the reaction. The inherent viscosity measured in 60/40 W/W phenol/symtetrachloroethane at a concentration of 0.5g polymer/100 ml solvent is 0.48 dl g$^{-1}$. The ratio of the storage moduli determined at $T_g-50°$ C. and $T_g+50°$ C. is 18.87. The $T_g$ when determined by the maximum for the damping (tan delta) curve on the Autovibron is 177° C.

EXAMPLES 1–5

Figure 3:
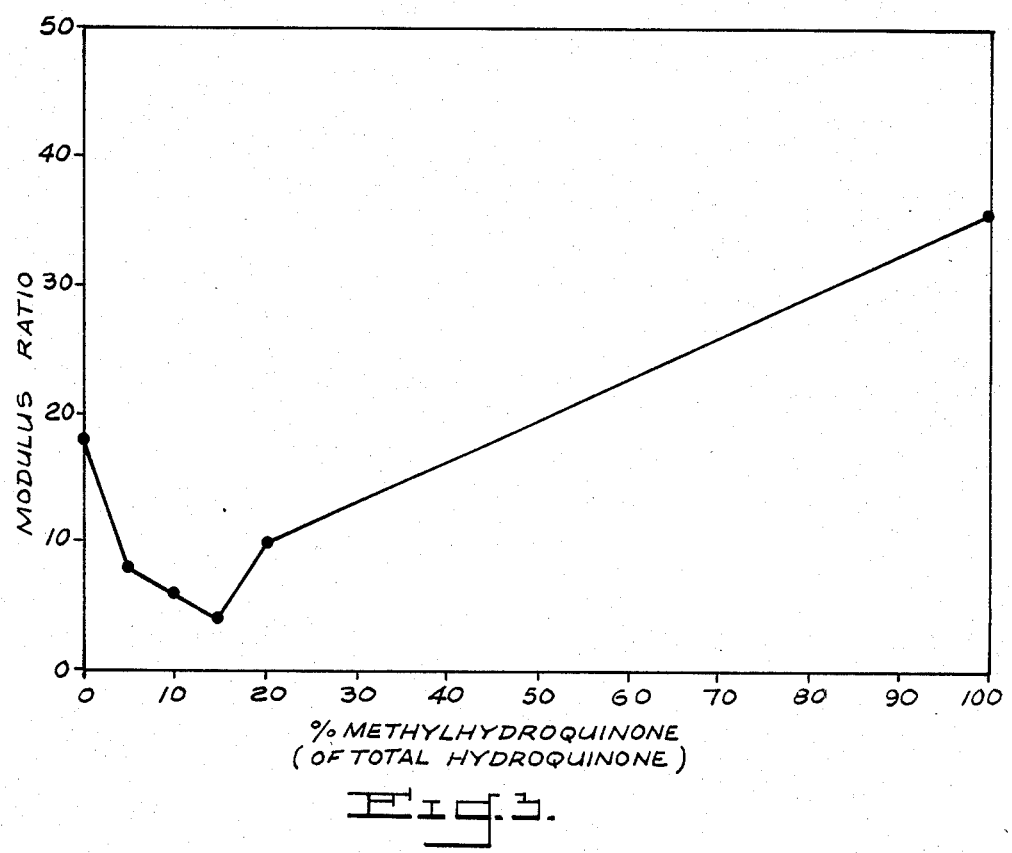

Examples 1–5 of copolyester composition were prepared by the process of the comparative example. The quantities of reactants used are listed in Table 1. The Autovibron-determined $T_g$'s, the storage moduli determined at $T_g-50°$ C. and $T_g+50°$ C., the ratios of the storage moduli, and the inherent viscosities are given in Table 2. FIG. 3 shows a plot of the ratio of the storage moduli for copolyesters in which from 0 to 100% of the hydroquinone has been replaced by methylhydroquinone and illustrates the surprising increase in the crystallinity when a specific amount of the hydroquinone has been substituted with methylhydroquinone. Example 5 contains no hydroquinone and has a relatively large storage moduli ratio.

The samples with 10 and 15 mole % of the hydroquinone replaced by methylhydroquinone were melt extruded from a 1 oz. Arburg extruder at an average temperature of 330° C., the hold time in the extruder being 25 sec. The mold temperature is 50° C. and the injection time is 0.7 sec. For the sample with 10 mole % of the hydroquinone replaced, the tensile strength was 99.3 MPa and the flexural modulus was 11.6×10$^3$ MPa. For the three samples with 15 mole % of the hydroquinone replaced, the average tensile strength was 159 MPa and the average flexural modulus was $10.1 \times 10^3$ MPa All tensile strengths were measured on standard ASTM tensile bars by ASTM D638. The flexural moduli were measured on molded bars (12.6 cm $\times$ 1.27 cm $\times$ 0.32 cm) by ASTM D790.

TABLE 1
REACTANTS

| Example | M (mole %) | P (g) | Q (g) | M (g) | I (g) | Ac₂O (ml) |
|---|---|---|---|---|---|---|
| Comparative | 0 | 10 | 8 | 0 | 12.1 | 25 |
| 1 | 5 | 10 | 7.6 | 0.45 | 12.1 | 25 |
| 2 | 10 | 10 | 7.2 | 0.90 | 12.1 | 25 |
| 3 | 15 | 10 | 6.8 | 1.35 | 12.1 | 25 |
| 4 | 20 | 10 | 6.4 | 1.80 | 12.1 | 25 |
| 5 | 100 | 10 | 0 | 9.0 | 12.1 | 25 |

M = methylhydroquinone
P = p-hydroxybenzoic acid
Q = hydroquinone
I = isophthalic acid
Ac₂O = acetic anhydride TABLE 2
PHYSICAL PROPERTIES for PQI/M polymers

| Example | Mole % M (of total Q) | Tg (°C.) | Modulus (M₁) (−50° C.) | Modulus (M₂) (+50° C.) | Ratio (M₁) (M₂) | Inh. Visc. |
|---|---|---|---|---|---|---|
| Comparative | 0 | 177 | 8.46e + 09 | 4.49e + 08 | 18.87 | 0.48 |
| 1 | 5 | 135 | 2.15e + 10 | 1.64e + 09 | 8.14 | 0.59 |
| 2 | 10 | 133 | 1.84e + 10 | 3.21e + 09 | 5.73 | 0.66 |
| 3 | 15 | 139 | 1.17e + 10 | 2.65e + 09 | 4.39 | 0.74 |
| 4 | 20 | 144 | 1.56e + 10 | 1.54e + 09 | 10.17 | 0.83 |
| 5 | 100 | 154 | 1.40e + 10 | 3.91e + 08 | 35.88 | 0.73 |

PQI = p-hydroxybenzoic acid/hydroquinone/isophthalic acid
M = methylhydroquinone
Q = hydroquinone
Tg = tan delta curve maximum
Inh. Visc. = inherent viscosity

I claim:

1. A copolyester capable of forming a thermotropic melt phase and having an inherent viscosity of at least about 0.3 measured at 30° C. with a solution of 0.5 gm of copolyester per 100 m/ of a solvent composed of 60 weight % phenol and 40% tetrachloroethane, consisting essentially of the following divalent radicals:

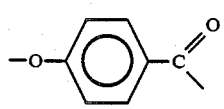
(A)

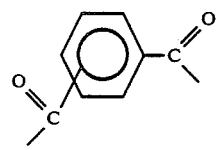
(B)

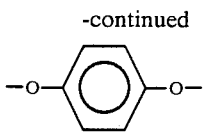
(C)

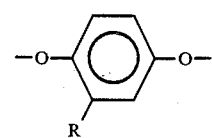
(D)

wherein the placements of the carbonyl groups of the B radicals are meta or para or a mixture of meta and para; wherein R is selected from the group consisting of alkyls of 1 to 6 carbon atoms, phenyl and phenyl substituted with an alkyl of 1 to 6 carbon atoms, chloro, bromo, cyano, formyl, acetyl, and trifluoromethyl; wherein the amount of radical A is in the range from about 10 mole % to about 60 mole % of the copolyester and wherein the amount of radical D is selected in the range from about 1 mole % up to about 50 mole % of the total amount of radicals C and D to provide a ratio of storage moduli of said copolyester determined at $T_g - 50°$ C. and $T_g + 50°$ C. less than the ratio of the storage moduli determined at $T_g - 50°$ C. and $T_g + 50°$ C. of a copolyester of identical composition except that the D radicals are replaced with C radicals.

2. The copolyester of claim 1 wherein radical R is selected from the group consisting of alkyls of 1 to 4 carbon atoms, phenyl, methyl, and chloro.

3. The copolyester of claim 1 wherein radical R is selected from the group consisting of methyl and chloro.

4. The copolyester of claim 1 wherein the amount of radical D is in the range from about 1 mole % to about 25 mole % of the total amount of radicals C and D.

5. The copolyester of claim 1 wherein the amount of radical D is in the range from about 5 mole % to about 20 mole % of the total amount of radicals C and D.

6. The copolyester of claim 1 wherein R is methyl.

7. The copolyester of claim 1 wherein the amount of radical A is in the range from about 15 mole % to about 40 mole % of the polyester.

8. The copolyester of claim 1 wherein the amount of radical A is in the range from about 20 mole % to about 35 mole %.

9. The copolyester of claim 1 wherein the inherent viscosity is at least about 0.5.

10. The copolyester of claim 1 wherein the ratio of storage moduli of said copolyester is less than 60% of the ratio of the storage moduli of a copolyester of identical composition except that the D radicals are replaced with C radicals.

11. The copolyester of claim 1 wherein the ratio of the storage moduli of said copolyester is less than 30% of the ratio of the storage moduli of a copolyester of identical composition except that the D radicals are replaced with C radicals.

12. The copolyester of claim 1 wherein the placements of the carbonyl groups of the B radicals are meta.

13. The copolyester of claim 12 wherein R is methyl and wherein the amount of radical D is in the range from about 5 mole % to about 20 mole % of the total amount of radicals C and D.

* * * * *